C. T. MASON.
IGNITION DYNAMO.
APPLICATION FILED JULY 28, 1913.
1,235,357.
Patented July 31, 1917.
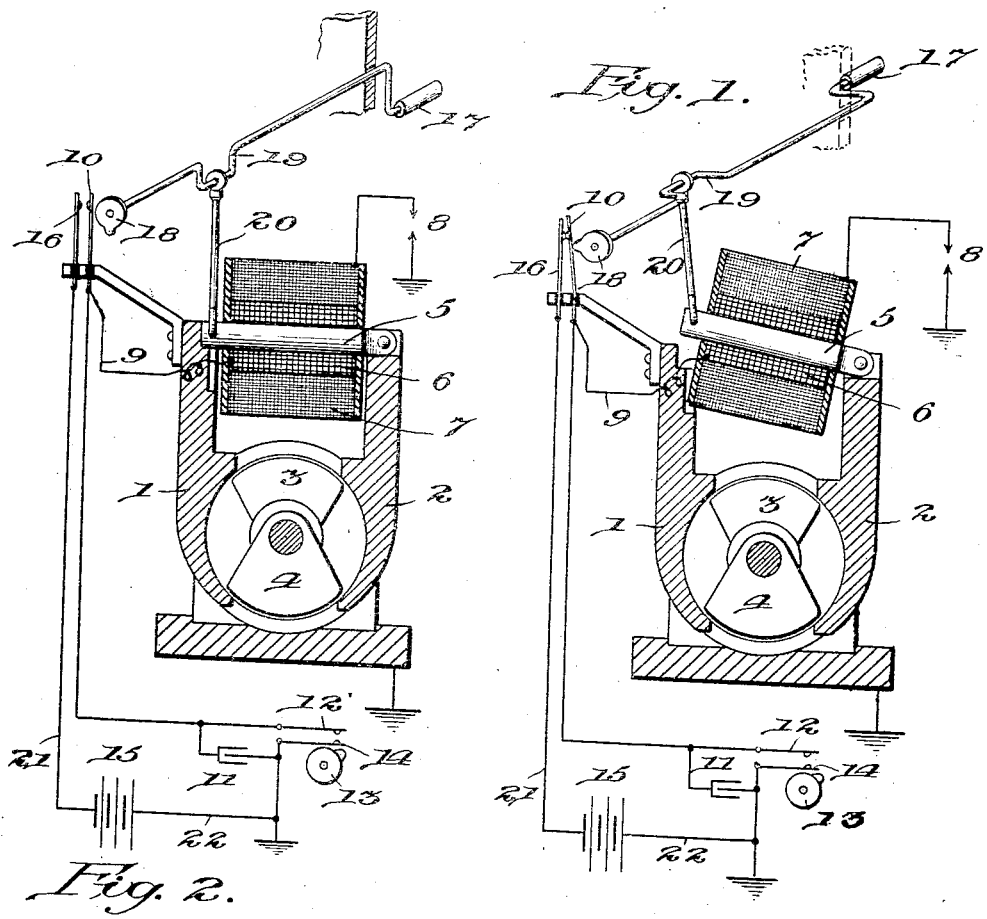
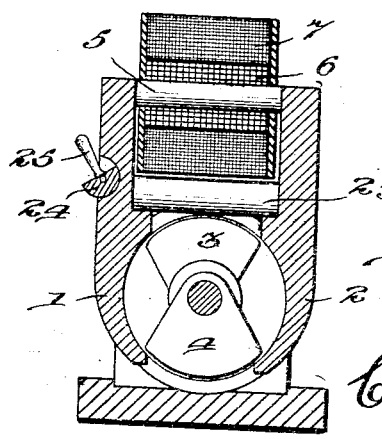
Witnesses
H. Löwenstein
James H. Marr
Inventor
Charles T. Mason
By H. R. Van Drosaten
Attorney

UNITED STATES PATENT OFFICE.

CHARLES THOMAS MASON, OF SUMTER, SOUTH CAROLINA, ASSIGNOR, BY MESNE ASSIGNMENTS, TO SPLITDORF ELECTRICAL COMPANY, OF NEWARK, NEW JERSEY, A CORPORATION OF NEW JERSEY.

IGNITION-DYNAMO.

1,235,857.

Specification of Letters Patent.

Patented July 31, 1917.

Application filed July 28, 1913. Serial No. 781,697.

*To all whom it may concern:*

Be it known that I, CHARLES THOMAS MASON, a citizen of the United States, residing at Sumter, in the county of Sumter and State of South Carolina, have invented certain new and useful Improvements in Ignition-Dynamos, of which the following is a specification, reference being had to the accompanying drawing.

My invention relates to ignition systems for internal combustion engines, and has for its object the production of a dual system in which the same circuit interrupter may be used for both sources of current, such for example as a battery to direct current dynamo machine, and an alternating current magneto.

Ancillary objects are to do away with the use of auxiliary coils and enable the generator windings to be used instead of battery current; to eliminate the necessity for reversing the poles of the battery to avoid demagnetization of the magneto; and to render it impossible for the battery current in any way to demagnetize the magneto; as well as other objects which will sufficiently appear from the description and claims hereinafter.

I attain my objects by employing a type of magneto machine having an armature structure with a generating coil fixed with relation to the rotor, and making said coil detachable or semi-detachable from the armature structure.

The invention is illustrated in the accompanying drawing, in which the figures are diagrammatic representations of the combination of elements constituting the system of my invention. I do not show herein the actual construction of the battery switch, the interrupter mechanism, or the dynamo with its movable coil, as my description will render the mechanical details sufficiently obvious to those skilled in the art, and furthermore any desired and suitable design or construction of these parts may be resorted to without departing from the spirit of my invention.

Figure 1 shows the system with the dynamo coil member and battery switch in position to use the battery as a source of sparking energy;

Fig. 2 shows the same with the parts in position to employ the magneto instead of the battery; and Fig. 3 shows a modified form of the mechanism employed to remove the generating windings of the dynamo from the magnetic circuit.

To render clear the advantages of my invention, it is necessary to refer briefly to the prior art wherein systems employing two sources of current are well known and have been commonly termed dual, duplex, or double systems. In some of these, two separate sets of spark plugs are employed, one set each for the dynamo and battery, with suitable switches whereby one or the other or both sets of plugs may be employed. This is usually termed the "independent" system and the complication is obvious. Where however, a single spark plug is employed for both sources of current which are alternately connected at will, a so-called dual system results, in which separate distributers, battery coils, etc. must be employed.

With either of the above mentioned systems, or any other in which two sources of current are employed, either a separate coil for the battery is used, or where the windings of the dynamo are employed instead of the coil, it is necessary to reverse the battery connections so that current therefrom will flow through the dynamo always in the same direction and the permanent magnets thereof will not be demagnetized. This arrangement necessitates a commutating device in the battery circuit, or an equivalent switch, and usually a separate interrupter distinct from that employed in the dynamo circuit. The switch and interrupter coil are usually combined in one element which it is customary in case of automobiles to mount on the dash. This necessitates wiring between the battery, the dynamo, and the switch, which I eliminate.

It is obvious that should this wiring be reversed so that the battery current is permitted to flow through the dynamo windings in a reverse direction, that the operation of the dynamo would be seriously affected. I eliminate this danger by so arranging my system that the polarity of the battery connection makes no difference, and employ one interrupter for both battery and dynamo, and so position the switch that it forms a unit with the dynamo itself.

In the figures, 1 and 2 represent the sides of an armature structure which is subjected to alternating reversals of magnetic flux due to the rotation within the structure of the rotor 3 and 4. These parts represent in theory any form of alternating current dynamo of the inductor type. In such machines permanent field magnets are commonly employed, and for the sake of illustration it will be presumed that the rotors 3 and 4 are of permanent opposite polarity as in the ignition dynamo disclosed in my application for Letters Patent Serial No. 432,681 of November 21, 1912. It will be understood that any form of alternating current dynamo having an armature structure carrying windings may be employed.

The core 5 connecting the members 1 and 2 when in the position shown in Fig. 2, forms part of the magnetic circuit of the armature structure. This core is movably mounted in any suitable manner so that it can be swung outward as illustrated in Fig. 1, thereby removing the windings from the magnetic circuit of the field structure. Upon this movable core 5 are placed suitable generating windings 6 and 7 in the case of a so-called high tension machine, although it is obvious that one or any number of windings may be employed. In the regular form of high tension machine winding 6 is the primary winding, and winding 7 the secondary or high tension winding. One end of each winding is connected to the core or frame of the machine. The remaining end of the high tension winding is connected to the spark plug 8, while the other end 9 of the primary winding is connected to one contact member 10 of the battery switch, to one side of the condenser 11, and to one member of the interrupter mechanism 12. This interrupter mechanism is of any type, the cam 13 usually being carried on the rotor shaft of the generator, and being of such form that it alternately opens and closes interrupter contacts 12 and 14, thereby intermittently short-circuiting the primary winding of the coil. The removal of the short-circuit is so timed that it takes place in synchronism with the passing of the maximum magnetic flux through the field structure. A spark is thereby produced at plug 8 as well understood.

In the case of an engine having a number of cylinders, a suitable distributing device is placed in the wire leading from the winding 7 so that the high tension current is successively connected to the plugs of the different cylinders. Such a modification is well known and obvious.

One side of the battery 15 is connected to the frame of the machine, or "grounded," while the other side is connected to contact 16 of the battery switch. As shown in Fig. 2, when the dynamo is employed as the source of current, the battery switch contacts 10 and 16 are opened and the core 5 carrying the generating windings is in position to complete the path for the magnetic flux, and consequently electromotive force is induced in one or both of the generating windings.

When it is desired to employ the battery, as for instance when starting the engine, by means of any suitable mechanism such as the crank 17 which is equipped with a cam 18, the switch contacts 10 and 11 are closed, and at the same time by any suitable means such as the crank 19 and rod 20, piece 5 carrying the generator windings is removed or separated from the members 1 and 2 of the armature structure, thereby removing the generating windings from the magnetic circuit. It will now be seen that current will flow from the battery 15 over conductor 21 through switch contacts 16 and 10, to the conductor 9, through the primary winding 6 to the frame of the machine, and from thence to the opposite side of the battery, the interrupter contacts 12 and 14 being open. As the rotor shaft revolves, interrupter contacts 12 and 14 are closed by cam 13, thereby short-circuiting the battery and winding 6. The rotor continuing to revolve, the interrupter contacts 12 and 14 are opened intermittently, thereby producing sparks at the plug 8 as required.

Since the generator windings are removed from the magnetic circuit of the dynamo, they do not when energized from the battery influence the field magnets in any way, and therefore the polarity of the battery 15 connected to the windings is immaterial. Furthermore, the fact that the dynamo is running does not effect the induction of current in the windings from the battery source for there is no current induced in the windings as a result of the revolution of the rotor. It is of course understood that any other source of current 15 may be employed instead of the battery.

I prefer to mount switch contacts 10 and 16 on the dynamo whereby they form a part of same and adjust them by any suitable means simultaneously with the adjustment of the coil carrying member 5. When this is done, there is no wiring except wires 21 and 22 from the battery. These wires may be connected without regard to the polarity thereof. The handle of 17 may be mounted on the dashboard, and operates the entire system. No other apparatus on the dashboard is required.

From the foregoing it will be seen that my invention consists broadly in removing the generating windings from the magnetic circuit of an ignition dynamo, so that the passage of current through the said windings will not affect the magnetization of the field magnets of the dynamo, and in arranging means for connecting and disconnecting battery current to said windings, said means to be operated simultaneously with the removal of the windings from the magnetic circuit. This eliminates the necessity for a multiplicity of wires, a number of switch contacts, two interrupters and other complications heretofore necessary, reducing the parts to the fewest possible number, and the wiring to a minimum.

While I have shown the generating winding as bodily removable from the dynamo, it will be readily understood that any means whereby the winding is removed from the action of the magnetic circuit of the dynamo, or the dynamo is prevented from acting on the winding, will suffice. Two such modifications are shown in Fig. 3. Here the windings and core 5 are fixed in the armature structures 1 and 2, a portion is cut out of pole piece 1, and a piece 24, movably positioned therein, as shown. This permits the area of the magnetic circuit to be varied, the area of cross section when 24 is opened to its greatest extent being so small that the action of the generating and field on each other is negligible. The pole pieces 1 and 2 may be on the other hand made solid, the core 5 fixed therein, and a short circuiting yoke 23 employed and so placed that the path for flux between poles 1 and 2 of the armature structure will lie through yoke 23 instead of 5, thereby removing the windings from the influence of the rotor 3 and 4. Such modifications as these I deem within the scope of my invention. I am aware that control of the magnetic circuit in dynamos has been attempted heretofore, but usually such means as auxiliary windings, intermediate polar extensions, and other electrical means have been employed to do electrically what I do mechanically with much less complication, and while some attempt to vary mechanically the relation of the windings to the magnetic circuit has been attempted in motors to regulate the speed, I am not aware that this principle has been applied to ignition dynamos for my purpose, or any other.

Having thus described my invention, what I claim and desire to secure by Letters Patent is—

1. An ignition system for internal combustion engines comprising a generating winding, and two means of excitation adapted to produce current in said generating winding, one of said means acting electrically on the winding and the other acting magnetically upon the same, together with means arranged to apply either means of excitation to the generating winding and simultaneously to remove the other.

2. An ignition system for internal combustion engines comprising an induction coil having a primary inducing winding and a secondary winding, a dynamo field structure and a primary battery each adapted to directly produce excitation of the primary followed by a current flow in the secondary of said coil and switching means arranged to shift said primary winding so as to be excited from said battery or from said dynamo field structure at will.

3. An ignition system for internal combustion engines comprising a generating winding, and two sources of excitation for said winding one of which is a dynamo field structure by means of which said generating coil may be normally excited, means to connect said coil with the other source for excitation, together with associated means to simultaneously reduce the permeability of the magnetic circuit of said dynamo field structure whereby the dynamo field is unaffected by excitation of said generating winding from said other source, and vice versa.

4. An ignition system comprising a dynamo, an induction coil included in the magnetic circuit of said dynamo, means whereby said coil may be placed in non-generating relation to said magnetic circuit, a make and break for the primary of said coil, a condenser connected to said make and break device, a source of current, and means whereby said source of current may be connected to said induction coil.

5. In an ignition system, a dynamo having an induction coil forming the generating winding thereof, means for disassociating said coil from the magnetic circuit of said dynamo, a source of current, a make and break device, a condenser, connections extending from said source of current, make and break device, and condenser, and means whereby said source of current may be connected to said coil.

6. An ignition system comprising a magneto generator having generating windings removably included in its magnetic circuit, a source of current, interrupter mechanism common to said source of current and said magneto, and means operated by a common handle for removing said windings from the magnetic circuit and connecting said source of current to said windings.

7. An ignition system comprising a magneto generator having generating windings removably positioned in its magnetic circuit, interrupter mechanism on said generator a condenser connected to said interrupter and carried by said dynamo, a switch mechanism carried by said dynamo, and a source of current controlled by said switching mechanism, and in combination, control means for removing said windings from the magnetic circuit of said dynamo and operating said switch mechanism to connect said source of current to said windings.

8. In an ignition system, a generating coil having primary and secondary windings and an iron core, a separate source of magnetism, means for directing flux therefrom through said core, means for varying the same to produce variable electromotive forces in the primary and secondary windings, a battery, and means for removing the core from the influence of said flux directing means, magnetizing the same by means of battery current through the primary winding, and producing operating currents in the secondary winding by varying the said battery current in the primary.

9. In an ignition system, a generating coil having primary and secondary windings and an iron core and alternative means to magnetize said core, comprising a source of magnetic flux and a source of electric current, together with means for preventing interference between the two.

10. An ignition system for internal combustion engines comprising an ignition dynamo having an induction coil the primary of which constitutes a generating winding and is normally subject to the influence of the magnetic field of the dynamo, a battery adapted to be connected with said primary winding to excite the same but normally disconnected therefrom, means to connect the battery with said winding and simultaneously remove said winding from the influence of the dynamo field.

11. A dynamo structure for ignition systems including generating windings, a separate and independent source of current, and means for connecting at will said separate and independent source of current to the generating windings for furnishing therethrough ignition current.

12. A dynamo structure for ignition systems including primary and secondary windings, an interrupter in circuit with the primary windings, a separate and independent source of current, and means for connecting at will said separate and independent source of current with said primary winding and interrupter for furnishing through the secondary winding ignition current.

13. A dynamo structure for ignition systems, including primary and secondary windings, an interrupter in circuit with the primary windings, a separate and independent source of current and means for rendering the dynamo generated flux ineffective and for connecting the independent source of current with said primary winding and interrupter of the dynamo for furnishing through the secondary winding of said dynamo ignition current.

14. A dynamo structure for ignition systems comprising field magnets, a rotor, generating windings, and a switch adapted to connect an outside circuit with said windings, in combination with mechanical actuating means for said switch extending to and operable from a point removed from the dynamo.

15. A dynamo structure for ignition systems comprising field magnets, a rotor, generating windings, and a switch adapted to connect an outside circuit with said windings, in combination with mechanical actuating means for said switch extending to and operable from a point removed from the dynamo, said rotor comprising permanently polarized elements constituting movable extensions of the field magnet poles, and said generating windings being normally fixed in relation to the rotor.

16. A dynamo structure for ignition systems comprising field magnets, a rotor, generating windings, and a switch adapted to connect an outside circuit with said windings, in combination with mechanical actuating means for said switch extending to and operable from a point removed from the dynamo, said rotor comprising permanently polarized elements constituting movable extensions of the field magnet poles, and said generating windings being normally fixed in relation to the rotor, but having secondary pole pieces adjustable around the axis of the rotor for purposes of timing.

In testimony whereof I hereunto affix my signature in the presence of two witnesses.

CHARLES THOMAS MASON.

Witnesses:
F. C. MANNING,
H. R. VAN DEVENTER.